| United States Patent [19]
Endriss et al.

[11] 3,876,440
[45] Apr. 8, 1975

[54] STABLE SOLUTIONS OF N-HALOGENO-ARYL-SULFONAMIDES AND THE USE THEREOF FOR PRE-TREATING RUBBER SURFACES

[75] Inventors: Gerhard Endriss; Heinz Libossek, both of Munich, Germany

[73] Assignee: Isar-Rakoll Chemi GmbH, Munich, Germany

[22] Filed: Feb. 5, 1973

[21] Appl. No.: 329,779

[30] Foreign Application Priority Data
Feb. 14, 1972 Germany............................ 2206860

[52] U.S. Cl........... 106/287; 117/47 R; 117/47 A
[51] Int. Cl.............................................. C09k 3/00
[58] Field of Search.................. 106/287; 260/543 R

[56] References Cited
UNITED STATES PATENTS
1,229,486   6/1917   Lindsay............................... 106/186
3,553,857   1/1971   Pettit................................. 12/146 B OTHER PUBLICATIONS
Chem Abst. 34: 81756.

Primary Examiner—Theodore Morris
Attorney, Agent, or Firm—Curtis, Morris & Safford

[57]          ABSTRACT

Stable solutions of an N-halogenosulfonamide of an aromatic sulfonic acid consisting essentially of 1 to 30 parts by weight of said N-halogeno-aryl-sulfonamide and 99 to 30 percent by weight of a solvent mixture containing from 10 to 90 percent by weight of methylene chloride and 90 to 100 percent by weight of 2-methyl-propanol-2.

The method of pre-treating the surface of vulcanized natural or synthetic rubber or of thermoplastic rubber with such a solution to improve the adhesion of said rubber when subsequently adhered with an adhesive such as a polyurethane.

1 Claim, No Drawings

STABLE SOLUTIONS OF N-HALOGENO-ARYL-SULFONAMIDES AND THE USE THEREOF FOR PRE-TREATING RUBBER SURFACES

The present invention relates to stable, neutral or acid solutions of an N-halogenosulfonamide of an aromatic sulfonic acid, and relates particularly to such solutions comprising from 1 to 30 percent by weight of said N-halogeno-aryl-sulfonamide and 99 to 70 percent by weight of a solvent mixture containing from 10 to 90 percent by weight of methylene chloride and 90 to 10 percent by weight of 2-methyl-propanol-2.

The present invention relates further to the use of the aforementioned solutions for the surface treatment of vulcanized natural or synthetic rubber or for the surface treatment of thermoplastic rubber for improvement of the adherence of these materials.

According to U.S. Pat. No. 2,234,611, the surfaces of rubber materials are treated with halogenating agents to improve their adhesion. The disadvantage of this process is that it employs aggressive agents, namely gaseous chlorine or aqueous chlorine.

However, more readily handleable halogenating agents, namely N-halogeno-sulfonamides, are known in the art. Thus, the sodium salt of N-chloro-p-toluene sulfonic acid amide has long been used in industry under the name "Chloramin-T." Free N-chloro-p-toluene sulfonamide can be obtained from this sodium salt by the known expedient of adding an equivalent amount of acid to a suspension of the sodium salt. Mineral acids, for example sulfuric acid or hydrochloric acid, are preferably used as acids. (Sulfuric acid is particularly preferred because of the good separation of sodium sulfate from the solution.) The sodium salt formed by this reaction is removed by filtration.

The use of N-halogenosulfonamides for the halogenization of rubber surfaces has been described by J.S.A. Langerwerf in a research report published by the Centrum voor Schoentechniek van het Instituut voor Leder en Schoenen TNO. According to this process, a solution of a N-halogenosulfonamide which has been acidified with an organic acid, for example oxalic acid, is employed. Since these solutions are not storage-stable, they must be prepared batchwise by the addition of the organic acid. Since a white precipitate forms on the addition of acid to a solution of a N-halogenosulfonamide, the use of such materials is, because of the interfering precipitate, generally not possible in, for example, coating machines.

The N-halogenosulfonamides are unstable compounds and heretofore could also not be stabilized in solution since they tend to disproportionate into the dichloride and the sulfonamide.

The solutions of the present invention are surprisingly stable, not only in neutral solutions but also in acid solutions (cf. Example 1). It is also surprising that the neutral solutions show the desired effect when used for the treatment of rubber surfaces even without the heretofore necessary addition of acid (cf. Example 2). (Solutions of N-chloro-p-toluene sulfonic acid amide by acidification of the sodium salt thereof with an equivalent amount of mineral acid are weakly acid (pH = 6 – 7). More acid solutions are prepared by use of an excess of mineral acid. Neutral solutions are prepared by adding less than an equivalent amount of mineral acid or by neutralizing a more acid solution with a base, suitably pyridine or morpholine.)

With the solvent system according to the present invention, the disadvantage of the known storage-unstable solutions of N-halogenosulfonamides has been overcome and the simple use of these solutions in practice has been made possible.

The N-halogenosulfonamides used according to the present invention are those of aromatic sulfonic acids, of which benzenesulfonic acid and p-toluene sulfonic acid can be mentioned as preferred. However, the sulfonic acids of higher alkylated or of condensed aromatic compounds can also be employed. Chlorine is preferred as the halogen component in the N-halogenosulfonamides.

The ratio of methylene chloride to 2-methyl-propanol-2 can be varied within the limits set forth. The same is true for the concentration of the N-halogenosulfonamide in the solvent mixture.

The application of the halogenating agent to a rubber surface can be effected by simple means, for example by painting it on. After evaporation of the solvent, the adhesive is applied to the treated surface and the surface is adhered.

The rubber materials which have been pre-treated according to the process of the present invention can suitably be adhered with the adhesives conventionally used therefor. Linear polyurethanes, or more exactly polyester urethanes, are the most preferred materials. These are addition products of linear polyesters having terminal hydroxy groups and diisocyanates, particularly aromatic diisocyanates. The polyesters are polycondensation products of dicarboxylic acids and an excess of a diol, or are polymerization products of lactones, for example caprolactone. Polyurethanes suitable for the aforementioned adhesion are, for example, described in German Auslegeschrift DAS 1,256,822 and in the work of E. Mueller entitled "The Structure of Urethane Elastomers" in Angewandte Makromolekular-Chemie, 14, 75 – 86 (1970).

The rubber materials which are pre-treated prior to adhesion according to the invention are vulcanizates of natural or synthetic rubber or mixtures of these materials with regenerated rubber. Suitable synthetic rubbers are the various copolymers of butadiene with styrene, acrylonitrile, and/or isobutylene, as well as poly-cis-isoprene and poly-cis-butadiene.

The thermoplastic rubbers are unvulcanized rubber materials which, in part, can be adhered only after a pre-treatment according to the present invention. Examples of such types of rubber are the product commercially available under the tradename "Cariflex" and related such as "Morvanflex," etc.

As known in the art, fillers, dyes, leveling agents, chlorinated rubbers, or post-chlorinated vinyl acetate polymers, as well as other resins which vary adhesion, can be added to the adhesives.

The quality of adhesive bonds formed is appropriately determined by measuring the peel resistance according to DIN 53 274.

A better understanding of the present invention and of its many advantages will be had by referring to the following specific examples, given by way of illustration.

The Examples employ a solution of N-chloro-p-toluene-sulfonic acid amide prepared from the corresponding sodium salt ("Chloramin T") as follows:

The aforementioned "Chloramin T" salt is suspended in a previously-prepared solvent mixture of methylene chloride and 2-methyl-propanol-2. The required calculated amount of concentrated sulfuric acid is added thereto over 15 minutes in a thin stream, taking care that the temperature does not rise above 35°C, since otherwise too large an amount of methylene chloride is boiled off. After about ½ hour, the remaining clear solution is decanted and the remaining precipitate is discarded.

The polyurethane adhesives employed in the Examples are polyester urethanes, specifically polyaddition products of (a) hydroxy-group-containing polyesters comprising aliphatic dicarboxylic acids, specifically adipic acid, and diols, specifically butane diol and/or hexane diol and (b) aromatic diisocyanates, specifically 2,6-diisocyanato-toluene (optionally in admixture with the 2,4-isomer) and/or 4,4'-diisocyanato-diphenylmethane. 20 percent solutions of these polyurethanes in methylethyl ketone are prepared.

EXAMPLE 1

| | | |
|---|---|---|
| Test body | | Nora Test/ Nora Test (test rubber produced by the Carl Freudenberg firm, Weinheim, Germany) |
| Pre-Treatment: | Solution(a): | 10 % solution of N-chloro-p-toluene-sulfonamide in methylene chloride/2-methyl-propanol-2 (89:11) neutralized with pyridine |
| | Solution(b): | 10 % solution of N-chloro-p-toluene-sulfonamide as in (a), but acid; pH = ca. 2 |
| Adhesive Strength: | | Measured according to DIN 53 274 |
| Adhesive: | | 95 parts by weight of a 20 percent solution, in methyl ethyl ketone, of a linear polyurethane (commercially available under the tradename "Desmocoll 400") and 5 parts by weight of a 20 percent solution, in methylene chloride, of triphenylmethane-4,4',4''-triisocyanate. |

Adhesive Strength: kilograms of force/centimeter (kgf/cm)

| Length of Storage of the N-halogen-sulfonamide Solution | Solution (a) (1) | Solution (a) (2) | Solution (b) (1) | Solution (b) (2) |
|---|---|---|---|---|
| Immediate use | 1.8 | 17.3* | 1.4 | 14.5* |
| 2 Weeks | 2.2 | 14.0* | 1.7 | 17.0* |
| 1 Month | 1.7 | 10.3* | 1.7 | 17.0* |
| 2 Months | — | — | 1.3 | 17.2* |

(1) Adhesive strength measured immediately after adhesion
(2) Adhesive strength measured after 3 days' storage of the adhesive bond
* = Total material failure of the test body

EXAMPLE 2

| | |
|---|---|
| Test body | Nora Test/ Nora Test (test rubber of the Carl Freudenberg firm, Weinheim, Germany) |
| Adhesive Strength: | Measured according to DIN 53 274 |
| Adhesive: | 95 parts by weight of a 20 percent solution, in methyl ethyl ketone, of a linear polyurethane commerically available under the tradename "Desmocoll 400" and 5 parts by weight of a 20 percent solution, in methylene chloride, of triphenylmethane-4,4',4''-triisocyanate |
| Pre-Treatment: | 10 % solution of N-chloro-p-toluene-sulfonamide in methylene chloride/2-methyl-propanol-2 (89:11) |

| pH of the N-halogeno-sulfonamide solution | Adhesive Strength: kgf/cm (1) | (2) |
|---|---|---|
| Acid, pH = ca. 2 | 2.3 | 13.1 |
| Neutral, pH = 7, prepared by titration addition of acid using litmus as an indicator | 1.5 | 11.2 |
| Neutral, prepared by addition of less than the calculated equivalent amount of acid | 1.4 | 16.0 |
| Neutral, by addition of pyridine using litmus as an indicator | 1.9 | 12.0 |

(1) Adhesive strength measured immediately after adhesion
(2) Adhesive strength measured after 3 days' storage of the adhesive bond

EXAMPLE 3

| Test body | Nora Test/ Nora Test (test rubber of the Carl Freudenberg firm, Weinheim, Germany |
|---|---|
| Adhesive Strength: | Measured according to DIN 53 274 |
| Adhesive: | 95 parts by weight of a 20 percent solution, in methyl ethyl ketone, of a linear polyurethane commercially available under the tradename "Desmocoll 400" and 5 parts by weight of a 20 percent solution, in methylene chloride, of triphenyl-methane 4,4',4''-triisocyanate |

| % Content of N-chloro-p-toluene-sulfon-amide in the solution | Solvent Ratio, Methylene Chloride: 2-methyl-propanol-2 | Adhesive Strength (kgf/cm) (1) | (2) |
|---|---|---|---|
| 5.6 | 87:13 | 2.0 | 11.9 |
| 6.2 | 15:85 | 3.4 | 13.5 |
| 7.3 | 10:90 | 1.8 | 14.2 |
| 14.6 | 85:15 | 1.3 | 15.9 |
| 21.9 | 45:55 | 2.3 | 12.8 |

(1) Adhesive strength measured immediately after adhesion
(2) Adhesive strength measured after 3 days' storage of the adhesive bond

What is claimed is:
1. A stable neutral or acid solution of an N-chloro-sulfonamide of benzene sulfonic acid or toluene sulfonic acid, said solution consisting essentially of 1 to 30 percent by weight of said N-chloro-sulfonamide and 99 to 70 percent by weight of a solvent mixture containing 10 to 90 percent by weight of methylene chloride and 90 to 10 percent by weight of 2-methyl-propanol-2.

* * * * *